United States Patent
Perret

(10) Patent No.: US 8,356,409 B2
(45) Date of Patent: Jan. 22, 2013

(54) REPAIR METHOD FOR GAS TURBINE ENGINE COMPONENTS

(75) Inventor: Edmundo J. Perret, Grand Prairie, TX (US)

(73) Assignee: United Technologies Corporation, Hartford, CT (US)

(*) Notice: Subject to any disclaimer, the term of this patent is extended or adjusted under 35 U.S.C. 154(b) by 1462 days.

(21) Appl. No.: 11/933,660

(22) Filed: Nov. 1, 2007

(65) Prior Publication Data

US 2010/0325887 A1 Dec. 30, 2010

(51) Int. Cl.
*B23P 6/00* (2006.01)
*B23K 31/00* (2006.01)
*B23K 15/06* (2006.01)

(52) U.S. Cl. ............ 29/889.1; 29/402.09; 29/402.11; 29/402.13; 29/402.16; 29/402.18; 228/119; 228/155; 228/160; 228/194; 228/206; 228/221; 228/248.1; 228/248.5

(58) Field of Classification Search ............ 29/888.011, 29/889.1, 402.09, 402.11, 402.13, 402.16, 29/402.18; 228/119, 155, 159–160, 193, 228/194, 201–202, 204, 205, 206, 208, 221, 228/248.1–248.5
See application file for complete search history.

(56) References Cited

U.S. PATENT DOCUMENTS

| | | | | |
|---|---|---|---|---|
| 3,589,952 | A * | 6/1971 | Burne | 148/24 |
| 5,167,721 | A | 12/1992 | McComas et al. | |
| 5,437,737 | A | 8/1995 | Draghi et al. | |
| 5,735,448 | A | 4/1998 | Draghi et al. | |
| 5,898,994 | A | 5/1999 | Miller et al. | |
| 6,049,978 | A | 4/2000 | Arnold | |
| 6,158,957 | A | 12/2000 | Marcin et al. | |
| 6,365,285 | B1 * | 4/2002 | Chesnes | 428/668 |
| 6,367,686 | B1 | 4/2002 | Abriles et al. | |
| 6,464,128 | B1 | 10/2002 | Messelling et al. | |
| 6,530,971 | B1 * | 3/2003 | Cohen et al. | 75/254 |
| 6,586,052 | B2 * | 7/2003 | Creech et al. | 427/376.1 |
| 6,726,086 | B2 | 4/2004 | Philip | |
| 7,199,174 | B2 * | 4/2007 | Ellison et al. | 524/439 |
| 7,222,422 | B2 * | 5/2007 | Gupta et al. | 29/889.1 |
| 7,244,320 | B2 | 7/2007 | Malley et al. | |
| 7,360,991 | B2 * | 4/2008 | Ford et al. | 415/173.1 |
| 2005/0067466 | A1 * | 3/2005 | Boegli et al. | 228/119 |
| 2007/0296967 | A1 * | 12/2007 | Gupta et al. | 356/318 |

* cited by examiner

*Primary Examiner* — Sarang Afzali
(74) *Attorney, Agent, or Firm* — Carlson, Gaskey & Olds PC

(57) ABSTRACT

A method for repairing a gas turbine engine component includes applying a braze slurry to a first portion of the component, applying a pre-sintered preform to a second portion of the component that is different than the first portion, and brazing the component.

16 Claims, 2 Drawing Sheets

REPAIR METHOD FOR GAS TURBINE ENGINE COMPONENTS

BACKGROUND OF THE INVENTION

This disclosure relates to a method of repairing a gas turbine engine component.

Gas turbine engines are a primary source of power for aircraft propulsion. The main components of a gas turbine engine include a compressor section, a combustor section and a turbine section. Each of these sections includes a plurality of components that may require repair after use in a particular environment. For example, both the compressor section and the turbine section include alternating rows of rotor blades supported on a rotor assembly and stator blades supported on a stator assembly by a plurality of stator shrouds. The severe operating conditions experienced by these components may cause surface deterioration of the components, such as stator shroud wear, for example. In some instances, the components within the turbine section may be exposed to service temperatures above 3,000° F. The relatively high cost of gas turbine engine components due to their respective materials necessitates repair of the components to attempt to extend their service life.

Repair of gas turbine engine components by brazing is known. This process typically involves applying braze material to the base alloy of the component followed by furnace operation. After the braze material is diffused into the base alloy by the furnace operation, the excess material is removed via a machining operation. For example, the excess material may be removed by milling, facing, drilling or grinding. The machining operation can expose surface pores on the gas turbine engine component under repair. The pores are caused by incomplete braze flow during the diffusion cycle of the vacuum furnace operation. This is referred to as "post machining porosity." If the pores are large enough, they may be deemed unacceptable and the relatively expensive gas turbine engine component must be removed from service and replaced by a new component.

SUMMARY OF THE INVENTION

A method for repairing a gas turbine engine component includes applying a braze slurry to a first portion of the component, applying a pre-sintered preform to a second portion of the component that is different than the first portion, and brazing the component.

A method for repairing a stator shroud of a gas turbine engine includes applying a braze slurry to the stator shroud, applying a pre-sintered preform to the stator shroud, and heating the stator shroud. A machining operation is also performed on the stator shroud.

A gas turbine engine includes a stator shroud having a platform including a weartrack having at least one groove. A braze slurry is positioned within the at least one groove of the weartrack. A pre-sintered preform is positioned on the weartrack. The braze slurry is positioned between the pre-sintered preform and the platform.

The various features and advantages of this invention will become apparent to those skilled in the art from the following detailed description. The drawings that accompany the detailed description can be briefly described as follows.

DETAILED DESCRIPTION OF THE DISCLOSED EMBODIMENT

The disclosed example gas turbine engine components and method of repair facilitate the reduction of post machining porosity.

Figure 1:
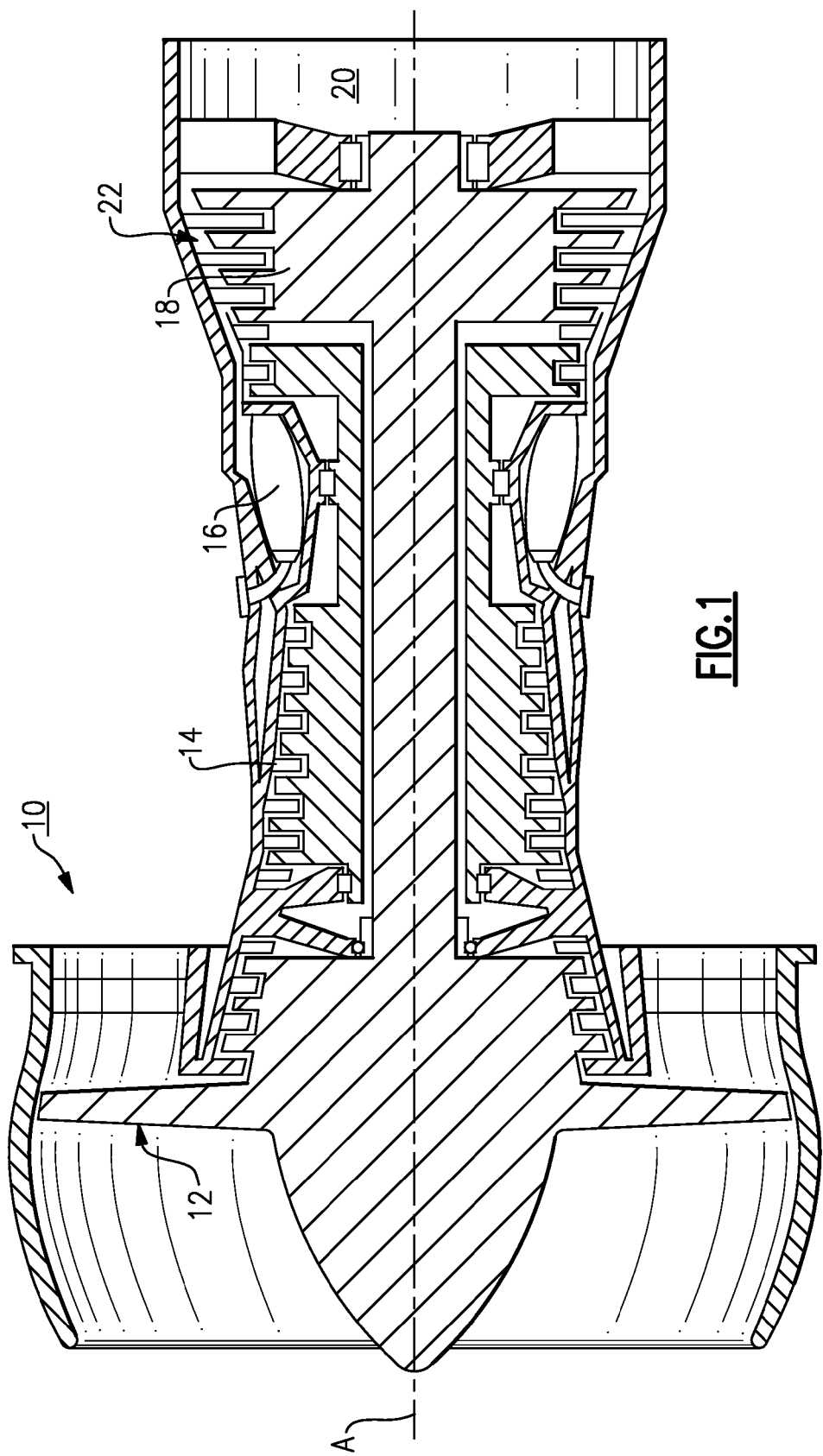
FIG. 1 illustrates a cross-sectional view of an example gas turbine engine.

FIG. 1 illustrates a gas turbine engine 10 that includes (in serial flow communication) a fan 12, a compressor section 14, a combustor section 16, a turbine section 18, and an exhaust nozzle 20. The gas turbine engine is defined about an engine centerline axis A about which the various engine sections rotate. During operation, air is pressurized in the compressor section 14 and mixed with fuel in the combustor section 16 for generating hot combustion gases. The hot combustion gases flow through the turbine section 18, which extracts energy from the hot combustion gases. The hot combustion gases are discharged form the gas turbine engine 10 through the exhaust nozzle 20. Of course, this view is highly schematic. It should be understood that the above parameters are only exemplary of a contemplated gas turbine engine 10. That is, the example methods described within this application are applicable to other engine architectures, and to any engine application.

Figure 2:
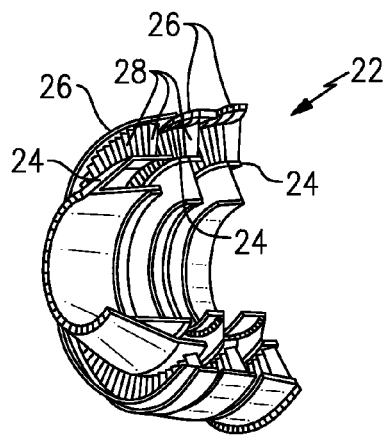
FIG. 2 illustrates an example stator assembly of a gas turbine engine.

FIG. 2 illustrates a stator assembly 22 of the gas turbine engine 10 illustrated in FIG. 1. In this example, the stator assembly 22 is representative of a stator assembly of the turbine section 18. The stator assembly 22 is illustrated as a multiple stage stator assembly 22. The stator assembly 22 includes a plurality of inner stator shrouds 24 and a plurality of outer stator shrouds 26. A plurality of stator vanes 28 extend between the inner stator shrouds 24 and the outer stator shrouds 26. In operation, the stator vanes 28 alter the direction of oncoming airflow and direct the airflow to the rotor blades to facilitate an increase in the velocity of the airflow.

Figure 3:
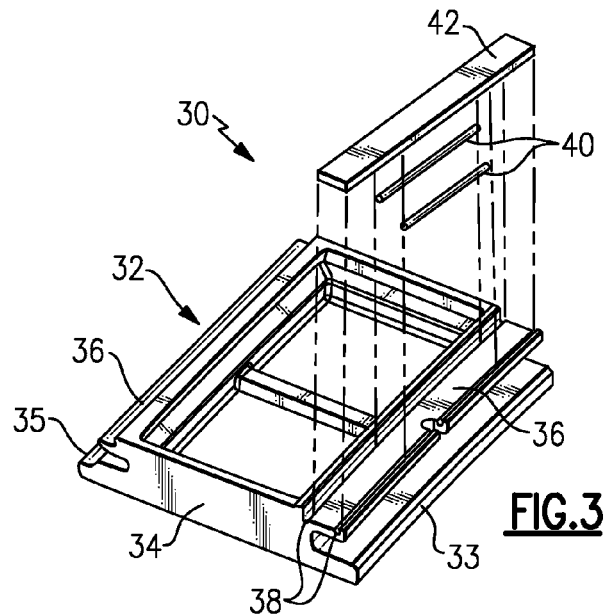
FIG. 3 illustrates a gas turbine engine component.

FIG. 3 illustrates an example gas turbine engine component 30. In this example, the gas turbine engine component 30 is a portion of a stator shroud 32. The gas turbine engine component 30 may be repaired utilizing an example repair method. Although the method described herein is illustrated with respect to repairing a stator shroud 32 of the gas turbine engine 10, it should be understood that any gas turbine engine component 30 that is subject to wear during the service life of the gas turbine engine 10 can be repaired using the example method.

The stator shroud 32 includes a platform 34 having a weartrack 36 disposed on opposing sides 33, 35 of the platform 34. The platform 34 receives a stator vane (not shown) for service within the turbine section 18. Each weartrack 36 includes a pair of grooves 38 formed therein. In one example, the stator shroud 32 is made of a nickel-based superalloy. However, other materials may be utilized to manufacture the stator shroud 32.

The weartracks 36 are in direct contact with the stator vanes when the stator assembly is assembled. Therefore, the weartracks 36 of the stator shroud 32 may experience wear due to high temperature operation in the engine and metal to metal contact with the stator vanes caused by vibration, etc. In one example, two forms of filler metals are utilized to repair the stator shroud 32. For example, a braze slurry 40, such as a pasty compound of metal powders and a binding agent, is positioned within the grooves 38 of the weartracks 36 of the stator shroud 32, and a pre-sintered preform 42 (i.e., a furnace hardened powder metal) is positioned on each weartrack 36 to repair worn weartracks, as is further discussed below.

Figure 4:
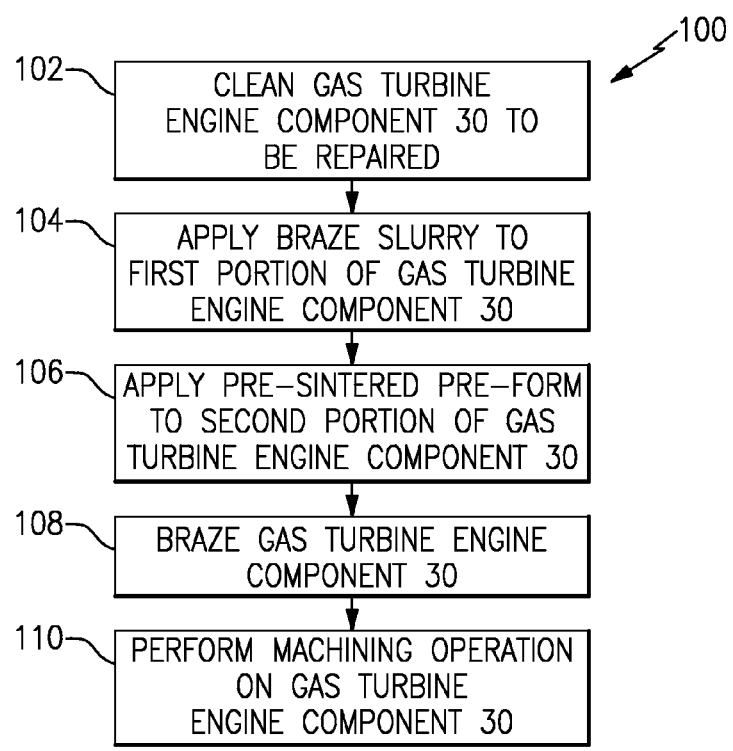
FIG. 4 illustrates an example method for repairing a gas turbine engine component.

FIG. 4, with continued reference to FIGS. 1-3, illustrates an example method 100 for repairing the gas turbine engine component 30. At step block 102, a worn surface of the gas turbine engine component 30 is cleaned to prepare the component 30 for repair. For example, the weartrack 36 of the stator shroud 32 may be cleaned to prepare for repair. In one example, the gas turbine engine component 30 is subjected to a fluoride ion cleaning operation. A fluoride ion cleaning operation is a surface cleaning method conducted in a furnace whereby fluoride ions are used to reduce metal oxides located on the gas turbine engine component 30. In addition, cleaning the gas turbine engine component 30 may include an abrasive blast operation. An abrasive blast operation is a mechanical method of cleaning parts with an abrasive media by using pressurized air.

Next, at step block 104, the braze slurry 40 is applied to a first portion of the gas turbine engine component 30. In one example, the braze slurry 40 is applied to the grooves 38 of the weartracks 36. The braze slurry 40 is a premixed braze slurry, in one example. The braze slurry 40 is applied between the pre-sintered preform 42 and the gas turbine engine component 30, in one example.

The pre-sintered preform 42 is applied to a second portion of the gas turbine engine component 30 at step block 106. In one example, step block 104 is performed prior to step block 106 such that at least some braze slurry 40 is positioned between the pre-sintered preform 42 and the component 30 prior to heating. The second portion of the gas turbine engine component 30 is different from the first portion. The pre-sintered preform 42 is a furnace hardened powder metal. Where the component 30 being repaired is a stator shroud 32, the pre-sintered preform 42 is applied to the weartracks 36 of the stator shroud 32 at step block 106. The braze slurry 40 and the pre-sintered preform 42 facilitate diffusion with a base alloy to form a metallurgical bond with the base alloy.

In one example, the braze slurry 40 includes a mixture of two alloy powders. One of the alloy powders includes a composition having Ni—14% CR—10% Co—4% Al—3% B, and the other alloy powder includes a composition having Ni—12% Co—7% Cr—6% Ta—6% Al—5% W—3% Ra—2% Hf—2% Mo, for example. In another example, the pre-sintered preform 42 includes a sintered mixture of two alloy powders having respective compositions of Ni—12% Co—7% Cr—6% Ta—6% Al—5% W—3% Ra—2% Hf—2% Mo with Ni—14% Cr—10% Co—4% Al—3% B, for example. It should be understood the disclosed examples are for illustrative purposes only and that other alloy mixtures are contemplated as within the scope of this application.

Next, at step block 108, the gas turbine engine component 30 is brazed. In one example, the gas turbine engine component 30 is subjected to a vacuum furnace combination melt and diffusion cycle. A vacuum furnace melt and diffusion cycle is an operation conducted in a vacuum furnace whereby a braze slurry and/or a pre-sintered preform is melted and diffused into a base alloy.

For example, after the combination of the braze slurry 40 and the pre-sintered preform 42 are applied to the worn surface of the component 30, the component 30 is placed in a vacuum furnace. A vacuum is drawn to an internal furnace pressure of approximately 0.0005 Torr or lower. The furnace temperature is then raised to 400° F. (204.4° C.) at a rate of 5° F./min and held at this temperature with an argon partial pressure of 1500 to 2500 microns for approximately 60 minutes.

The temperature is then raised to 500° F. (260° C.) at a rate of 5° F./min and held at this temperature for 10 minutes, then raised to 800° F. (426.7° C.) at the 5° F/min rate and held at this temperature for 10 minutes, and then raised to 1000° F. (537.8° C.) at the same rate and held for 10 minutes. The temperature is next raised to 1200° F. (648.9° C.) at a rate of 5° F./min, at which point the argon partial pressure is turned off and the temperature is held for 60 minutes. The temperature is then raised to 1900° F. (1037.8° C.) at a rate of 45° F./min and held at this temperature for 30 minutes. Finally, the temperature is raised to 2251±5° F. (1232.8±−15° C.) at a rate of 45° F./min and held for 145±5 minutes. The furnace temperature is lowered in a vacuum to 1500° F. (815.6° C.), and then convectively cooled down to below 150° F. (65.6° C.). The braze slurry 40 and the pre-sintered preform 42 start to melt at a temperature of 2100° F. (1148.9° C.) and diffuse into the base alloy at the 2251±5° F. (1232.8±−15° C.) temperature. A person of ordinary skill in the art would understand that the example parameters of the vacuum furnace combination melt and diffusion cycle described herein are for illustrative purposes only and that modifications to these parameters are possible.

Finally, at step block 110, the repaired gas turbine engine component 30 undergoes a machining operation. In one example, the machining operation includes a high speed grinding operation. However, the machine operation can include any conventional operation that removes metal such as milling, facing, drilling, reaming, boring, etc. The machining operation is performed to remove any excess braze build up on the gas turbine engine component 30. The example method 100 facilitates a restored surface on the gas turbine engine component 30 with a reduced amount of post machining porosity by providing two filler metals including the braze slurry 40 provided between the pre-sintered preform 42 and the component 30.

The foregoing description shall be interpreted as illustrative and not in any limiting sense. A worker of ordinary skill in the art would understand that certain modifications would come within the scope of this invention. For that reason, the following claims should be studied to determine the true scope and content of this invention.

What is claimed is:

1. A method for repairing a gas turbine engine component, comprising the steps of:
   a) applying a braze slurry that includes a pasty compound of metal powders to a first portion of the component, wherein the step of applying includes applying the braze slurry within a groove of the component;
   b) applying a pre-sintered preform to a second portion of the component that is different from the first portion; and
   c) brazing the component subsequent to said steps a) through b).

2. The method as recited in claim 1, comprising the step of:
   d) cleaning a surface of the component to be repaired.

3. The method as recited in claim 2, wherein said step d) includes the steps of:
   performing a fluoride ion cleaning operation on the component; and
   performing an abrasive blast operation on the component subsequent to the fluoride ion cleaning operation.

4. The method as recited in claim 1, comprising the step of:
   d) performing a machining operation on the component subsequent to said steps a) through c).

5. The method as recited in claim 4, wherein the machining operation includes a high-speed grinding operation.

6. The method as recited in claim 1, wherein the braze slurry includes a mixture of a first alloy powder and a second alloy powder.

7. The method as recited in claim 6, wherein the first alloy powder includes a composition having Ni—14% CR—10% Co—4% Al—3% B and the second alloy powder includes a composition having Ni—12% Co—7% Cr—6% Ta—6% Al—5% W—3% Ra—2% Hf—2% Mo.

8. The method as recited in claim 1, wherein the pre-sintered preform includes a sintered mixture of two alloy powders.

9. The method as recited in claim 8, wherein the two alloy powders include compositions of Ni—12% Co—7% Cr—6% Ta—6% Al—5% W—3% Ra—2% Hf—2% Mo with Ni—14% Cr—10% Co—4% Al—3% B.

10. The method as recited in claim 1, wherein the component is made of a nickel-based superalloy.

11. The method as recited in claim 1, wherein the braze slurry is applied between the pre-sintered preform and the component.

12. The method as recited in claim 1, wherein said step c) includes the step of:

performing a vacuum furnace combination melt and diffusion cycle on the component.

13. The method as recited in claim 1, wherein said step a) is performed prior to said step b).

14. The method as recited in claim 1, wherein said step a) and said step b) are performed prior to removing any surface of the component.

15. The method as recited in claim 1, wherein the pre-sintered preform is positioned at least partially over the groove such that the braze slurry is between the pre-sintered preform and the component.

16. A method for repairing a gas turbine engine component, comprising the steps of:
   a) applying a braze slurry within a groove of the component, wherein the braze slurry includes a pasty compound of metal powders;
   b) applying a pre-sintered preform to a second portion of the component that is different from the groove; and
   c) brazing the component subsequent to said steps a) through b).

* * * * *